US011174797B2

(12) United States Patent
Gebhard et al.

(10) Patent No.: US 11,174,797 B2
(45) Date of Patent: Nov. 16, 2021

(54) OIL SYSTEM FOR A GAS TURBINE ENGINE HAVING AN ACCUMULATOR FOR ENERGY STORAGE

(71) Applicant: Rolls-Royce Corporation, Indianapolis, IN (US)

(72) Inventors: John R. Gebhard, Fishers, IN (US); Adam L. Kempers, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 251 days.

(21) Appl. No.: 16/293,084

(22) Filed: Mar. 5, 2019

(65) Prior Publication Data

US 2020/0284195 A1    Sep. 10, 2020

(51) Int. Cl.
*F02C 7/06* (2006.01)
*F02C 7/36* (2006.01)

(52) U.S. Cl.
CPC . *F02C 7/36* (2013.01); *F02C 7/06* (2013.01)

(58) Field of Classification Search
CPC . F02C 7/06; F01D 25/18; F01D 25/20; F05D 2260/98
See application file for complete search history.

(56) References Cited

U.S. PATENT DOCUMENTS

| 3,152,333 | A | * | 10/1964 | Matt | F16N 17/00 |
| | | | | | 184/6.12 |
| 4,511,016 | A | | 4/1985 | Doell | |
| 6,267,147 | B1 | | 7/2001 | Rago | |
| 6,463,819 | B1 | | 10/2002 | Rago | |
| 8,230,974 | B2 | | 7/2012 | Parnin | |
| 8,746,404 | B2 | | 6/2014 | Allam | |
| 9,410,448 | B2 | | 8/2016 | Sherian et al. | |
| 9,739,173 | B2 | | 8/2017 | Valva et al. | |
| 10,072,521 | B2 | | 9/2018 | Mastro et al. | |
| 2006/0081419 | A1 | * | 4/2006 | Care | F16N 7/40 |
| | | | | | 184/6.11 |
| 2013/0319006 | A1 | * | 12/2013 | Parnin | F01D 25/18 |
| | | | | | 60/805 |
| 2016/0160686 | A1 | * | 6/2016 | Cigal | F01D 25/18 |
| | | | | | 184/6.11 |
| 2018/0163625 | A9 | | 6/2018 | Sheridan | |
| 2020/0191054 | A1 | * | 6/2020 | Parnin | F01D 17/20 |
| 2020/0200043 | A1 | * | 6/2020 | Parnin | F01D 25/20 |

* cited by examiner

*Primary Examiner* — William H Rodriguez
(74) *Attorney, Agent, or Firm* — Barnes & Thornburg LLP

(57) ABSTRACT

A gas turbine engine includes a power unit and an oil system configured to lubricate the power unit during operation of the gas turbine engine. The power unit includes an engine core and a fan coupled with the engine core and driven by the engine core to produce thrust for propelling the gas turbine engine during operation of the gas turbine engine.

14 Claims, 5 Drawing Sheets

OIL SYSTEM FOR A GAS TURBINE ENGINE HAVING AN ACCUMULATOR FOR ENERGY STORAGE

FIELD OF THE DISCLOSURE

The present disclosure relates generally to gas turbine engines, and more specifically to oil systems for use with gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Gas turbine engines may use lubricant in areas with rotating components to cool the components and reduce friction produced during the operation of the gas turbine engine. The lubricant may collect in one or more sumps and can be recirculated back to the areas of the gas turbine engine using oil pumps.

SUMMARY

The present disclosure may comprise one or more of the following features and combinations thereof.

A gas turbine engine may include a power unit, an oil system, and an oil accumulator. The power unit may include an engine core, a fan, and a gearbox. The engine core may comprise a compressor, a combustor, and a turbine. The fan may be configured to provide thrust for propelling the gas turbine engine. The gearbox may be coupled with the fan and the turbine to transmit rotational energy from the turbine to the fan during operation of the gas turbine engine. The oil system may be configured to conduct oil to the gearbox during operation of the gas turbine engine. The oil system may include an oil tank, conduit in fluid communication with the oil tank and configured to conduct oil to the gearbox, and an oil pump configured to move oil from the oil tank through the conduit.

The oil accumulator may contain a store of pressurized oil. The oil accumulator may be in fluid communication with the conduit and configured to conduct the store of pressurized oil through the conduit to the gearbox in response to the gas turbine engine experiencing a zero g-force event.

In some embodiments, the gearbox may include a pinion gear configured to rotate about an axis and a plurality of planetary gears arranged circumferentially around the pinion gear relative to the axis and meshed with the pinion gear. Each of the planetary gears may include a plain bearing on which the planetary gear rotates during operation of the gas turbine engine. The conduit may be configured to conduct oil toward the plain bearing of each of the plurality of planetary gears.

In some embodiments, the oil accumulator may comprise a tank that contains the store of pressurized oil. In some embodiments, the oil tank and the oil pump may be connected with the conduit in series. The oil accumulator may be connected with the conduit in parallel relative to the oil pump.

In some embodiments, the oil pump may supply the store of pressurized oil to the oil accumulator. In some embodiments, the oil accumulator may be configured to conduct the store of pressurized oil into the conduit upstream of the oil pump. In some embodiments, the gas turbine engine may include a pressurized oil source configured to supply the store of pressurized oil to the oil accumulator.

In some embodiments, the oil accumulator may be arranged to receive pressurized oil from the oil pump, to store a first portion of the pressurized oil to form the store of pressurized oil, and to bypass a second portion of the pressurized oil through the oil accumulator. In some embodiments, the oil pump, the oil tank, and the oil accumulator may be connected with the conduit in series such that the oil pump is located in series between the oil tank and the oil accumulator.

In some embodiments, the oil accumulator includes an inner tube in fluid communication with the conduit and an outer tube arranged around the inner tube. The inner tube may be configured to bypass oil through the oil accumulator. The outer tube may be configured to contain the store of pressurized oil.

According to another aspect of the present disclosure, a gas turbine engine may include a power unit, an oil system, and an oil accumulator. The power unit may include a fan, an engine core, and a gearbox. The engine core may comprise a compressor, a combustor, and a turbine. The gearbox may be coupled with the fan and the turbine. The oil system may include an oil tank, conduit in fluid communication with the oil tank and configured to conduct oil from the oil tank to the gearbox, and a pump configured to move oil from the oil tank through the conduit. The oil accumulator may contain a store of pressurized oil and may be configured to selectively conduct the store of pressurized oil to the gearbox.

In some embodiments, the gas turbine engine may include a valve and a controller. The valve may be in fluid communication with the oil accumulator. The controller may be configured to activate the valve to allow the oil accumulator to conduct the store of pressurized oil to the gearbox in response to the gas turbine engine experiencing a zero g-force event.

In some embodiments, the pump may be configured to supply the oil accumulator with the store of pressurized oil. In some embodiments, the gas turbine engine may include a pressurized oil source configured to supply the store of pressurized oil to the oil accumulator.

In some embodiments, the pump, the oil tank, and the oil accumulator may be connected with the conduit in series such that the pump is located in series between the oil tank and the oil accumulator. In some embodiments, the oil tank and the pump may be connected with the conduit in series and the oil accumulator is connected with the conduit in parallel relative to the pump.

In some embodiments, the oil accumulator may include a first tube in fluid communication with the conduit and a second tube in fluid communication with the conduit. The first tube may be configured to bypass oil through the oil accumulator. The second tube may be configured to contain the store of pressurized oil.

According to another aspect of the present disclosure, a method may include a number of steps. The method may include providing a gearbox for use with a gas turbine engine, an oil system, and an oil accumulator, charging the oil accumulator with a store of pressurized oil, conducting oil to the gearbox from the oil system, and conducting the store of pressurized oil from the oil accumulator to the gearbox.

In some embodiments, the method may include detecting a zero g-force event. The method may include opening a valve in fluid communication with the oil accumulator in response to detecting the zero g-force event before the step of conducting the store of pressurized oil from the oil accumulator to the gearbox.

In some embodiments, the oil system may include an oil tank, a conduit configured to conduct oil to the gearbox, and a pump configured to move oil from the oil tank through the conduit. The method may include detecting a pressure in the conduit is less than a predetermined value and opening a valve in fluid communication with the oil accumulator in response to detecting the pressure in the conduit is less than the predetermined value before the step of conducting the store of pressurized oil from the oil accumulator to the gearbox.

These and other features of the present disclosure will become more apparent from the following description of the illustrative embodiments.

DETAILED DESCRIPTION OF THE DRAWINGS

Figure 1:
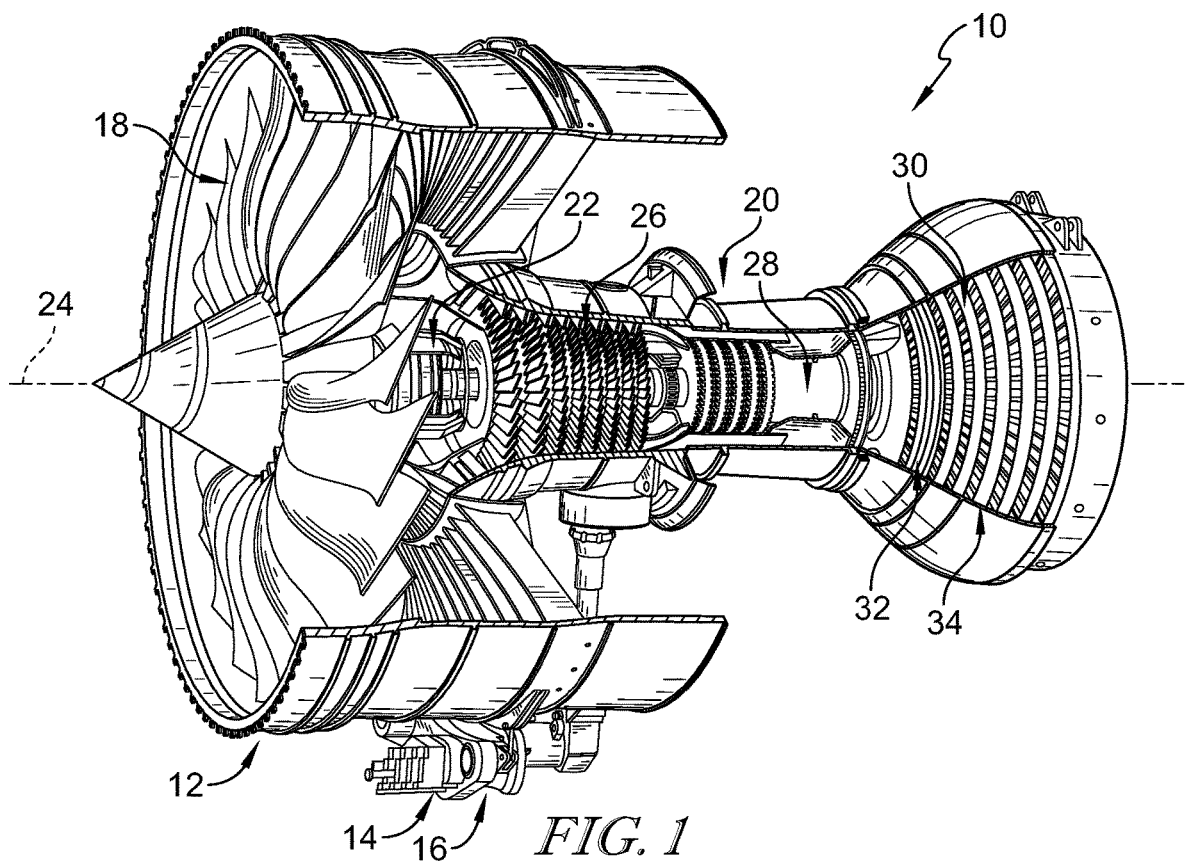
FIG. 1 is a perspective view of a gas turbine engine in accordance with the present disclosure, the gas turbine engine includes a power unit having a fan for providing thrust for the engine, an engine core for driving rotation of the fan, and a gearbox configured to transmit power from the engine core to the fan and the gas turbine engine including an oil system for conducing oil to the gearbox.

For the purposes of promoting an understanding of the principles of the disclosure, reference will now be made to a number of illustrative embodiments illustrated in the drawings and specific language will be used to describe the same.

Figure 2:
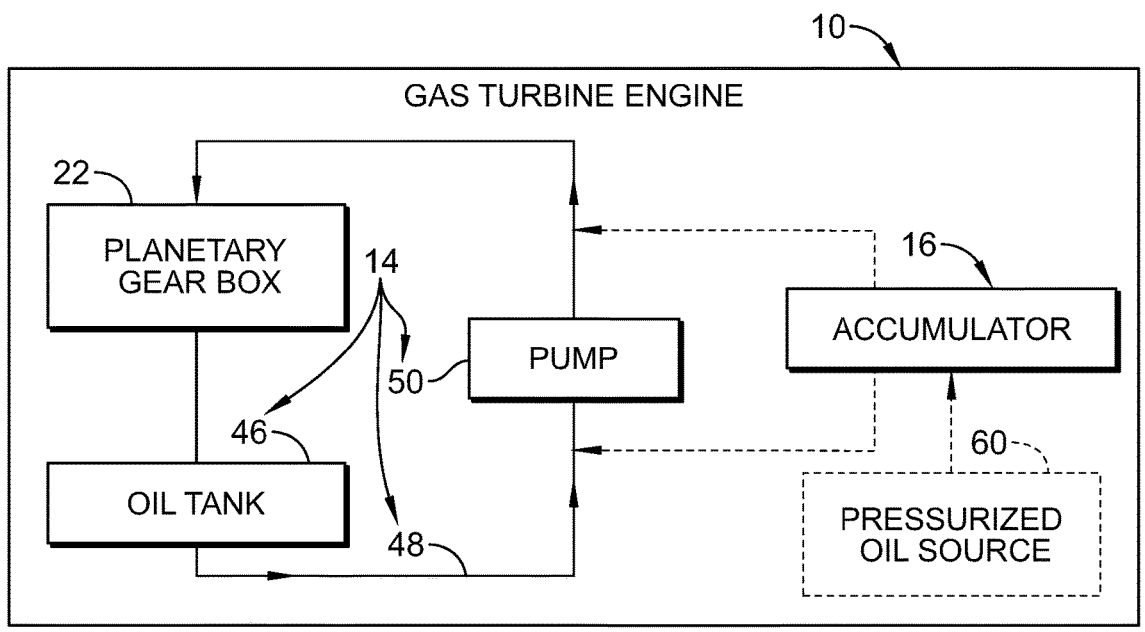
FIG. 2 is a diagrammatic view of the gas turbine engine of FIG. 1 showing that the oil system included in the gas turbine engine includes an oil tank and a pump configured to conduct oil from the oil tank to the gearbox via conduit and that the gas turbine engine further includes an oil accumulator that contains a store of pressurized oil that can be conducted selectively to the gearbox through the conduit in response to predetermined flight conditions such as a zero g-force event to maintain oil flow to the gearbox.

An illustrative gas turbine engine 10 includes a power unit 12, an oil system 14, and an oil accumulator 16 as shown in FIGS. 1 and 2. The power unit 12 includes a fan 18 configured to rotate about an axis 24 to produce thrust for propelling the gas turbine engine 10, an engine core 20 configured to power rotation of the fan 18, and a gearbox 22 configured to transmit power from the engine core 20 to the fan 18 during operation of the gas turbine engine 10. The oil system 14 is configured to conduct oil to the gearbox 22 during operation of the gas turbine engine 10. The oil accumulator 16 contains a store of pressurized oil and is configured to conduct the store of pressurized oil to the gearbox 22 in response to the gas turbine engine 10 experiencing a predetermined flight condition such as, for example, a zero g-force event (sometimes called a zero gravity event) to maintain oil flow to the gearbox 22 during the condition.

The engine core 20 included in the power unit 12 includes a compressor 26, a combustor 28, and a turbine 30 as shown in FIG. 1. The compressor 26 compresses and delivers pressurized air to the combustor 28. The combustor 28 mixes fuel with the compressed air received from the compressor 26 and ignites the fuel. The hot, high-pressure products of the combustion reaction in the combustor 28 are directed into the turbine 30 to cause the turbine 30 to rotate about the axis 24 and drive the compressor 26 and the fan 18. In other embodiments, the fan 18 is omitted and the engine core 20 powers a propeller or a drive shaft for rotating a thrust device or for providing rotational energy in an industrial setting.

Illustratively, the turbine 30 includes a high-pressure turbine stage 32 and a low-pressure turbine stage 34 as shown in FIG. 1. The high-pressure turbine stage 32 is configured to rotate about the axis 24 and drive the compressor 26. The low-pressure turbine stage 34 is located downstream of the high-pressure turbine stage 32 and configured to rotate about the axis 24 independent of the high-pressure turbine stage 32 to drive the fan 18 through the gearbox 22. The gas turbine engine 10 may include an intermediate-pressure turbine stage and each turbine stage may include one or more bladed wheels.

The gearbox 22 (sometimes called a power gearbox) is a planetary gearbox 22 in the illustrative embodiment as shown in FIGS. 1 and 2. The gearbox 22 is coupled with the fan 18 and with the low-pressure turbine stage 34. The gearbox 22 transmits power from the low-pressure turbine stage 34 to the fan 18 to drive rotation of the fan 18 about the axis 24. The gearbox 22 allows the low-pressure turbine stage 34 to rotate about the axis 24 at a different speed than the fan 18. In illustrative embodiments, the gearbox 22 allows the low-pressure turbine stage 34 to rotate about the axis 24 at a greater rotational speed than the fan 18.

Figure 3:
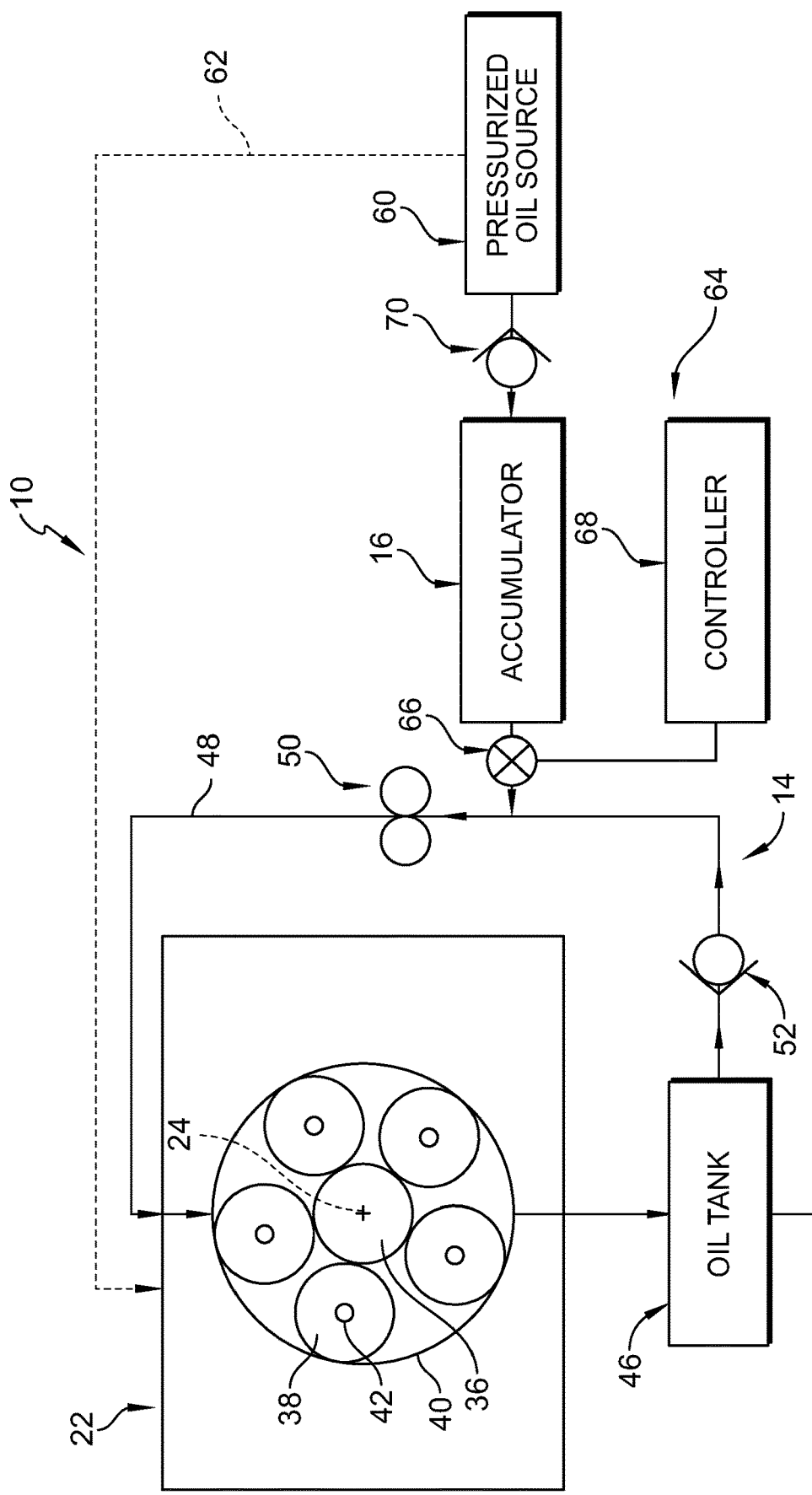
FIG. 3 is a diagrammatic view of an arrangement of the gearbox, oil system, and oil accumulator adapted for use with the gas turbine engine of FIG. 1 showing the accumulator fluidly connected with the conduit upstream of the pump and configured to be pressurized by a pressurized oil source.

The gearbox 22 includes a pinion gear 36 and a plurality of planetary gears 38 as shown in FIG. 3. The illustrative gearbox 22 further includes a ring gear 40 though, in some embodiments, the ring gear 40 is omitted. The pinion gear 36 is coupled with the low-pressure turbine stage 34 and rotated about the axis 24 by the low-pressure turbine stage 34 during operation of the gas turbine engine 10. The plurality of planetary gears 38 are arranged circumferentially around the pinion gear 36. The plurality of planetary gears 38 are meshed with the pinion gear 36 and are driven to rotate about the axis 24 by the pinion gear 36 in response to rotation of the pinion gear 36. The ring gear 40 is arranged circumferentially around and meshed with the plurality of planetary gears 38. The ring gear 40 may rotate about the axis 24 or may be fixed relative to the axis 24 selectively. Illustratively, each of the plurality of planetary gears 38 is configured to rotate on a plain bearing 42 (sometimes called a journal bearing).

The oil system 14 is configured to conduct oil to the gearbox 22 during operation of the gas turbine engine 10 as suggested in FIG. 2. In illustrative embodiments, the oil system 14 is an auxiliary oil system for the gas turbine engine 10 and provides oil to the gearbox 22 while another oil system provides oil to other components of the gas turbine engine 10. In some embodiments, the oil system 14 is a main oil system 14 that conducts oil to the gearbox 22 and to other components of the gas turbine engine 10 such as bearings for the compressor 26 and turbine 30 for example.

The oil system 14 includes an oil tank 46, conduit 48 in fluid communication with the oil tank 46, and a pump 50 as shown in FIGS. 2 and 3. The oil tank 46 contains a store of oil that is configured to be gravity fed to the conduit 48. The store of oil in the oil tank 46 is at about ambient pressure or slightly pressurized above ambient pressure. The conduit 48 is fluidly connected with the oil tank 46 and the pump 50 and configured to conduct oil to the gearbox 22. The conduit 48 directs the oil toward the plain bearings 42 of the gearbox 22 in the illustrative embodiment. In some embodiments, the conduit includes nozzles configured to direct the oil toward the plain bearings 42. The pump 50 moves oil from the oil tank 46 through the conduit 48 to the gearbox 22.

The oil system 14 further includes flow valves in the illustrative embodiment. A one-way valve 52 (sometimes called a check valve) is located in series between the oil tank 46 and the pump 50 as shown in FIG. 3 to block oil from moving back into the oil tank 46. A portion of oil in the oil tank 46 may be conducted from the oil tank 46 to another location such as, for example, to a primary scavenge pump as suggested by arrow 54 in FIG. 3.

The oil accumulator 16 contains the store of pressurized oil so that the store of pressurized oil may be released and directed to the plain bearings 42 and/or other components of the gearbox 22 during a predetermined flight condition such as a zero g-force event. A zero g-force event may be an event in which the gas turbine engine 10 experiences weightlessness, zero gravitational force applied to the gas turbine engine 10, and/or a net downward force applied to the gas turbine engine 10. The oil accumulator 16 comprises a tank, vessel, or other suitable alternative for storing oil under pressure.

During a zero g-force event or other flight condition, the oil in the oil tank 46 may be moved away from the outlet to the conduit 48. For example, the outlet may be located at a bottom of the oil tank 46 and may be gravity fed by the oil which is typically located at the bottom of the oil tank 46 due to gravity. A zero g-force event or other flight condition may cause the oil to be moved away from the bottom outlet of the oil tank 46 or otherwise not able to be pulled through the outlet and conduit 48 by pump 50. The forces on and inertia of the oil and oil tank 46 may cause the oil to be 'floating' in the oil tank 46 or urged against a top or side wall of the oil tank 46.

Figure 4:
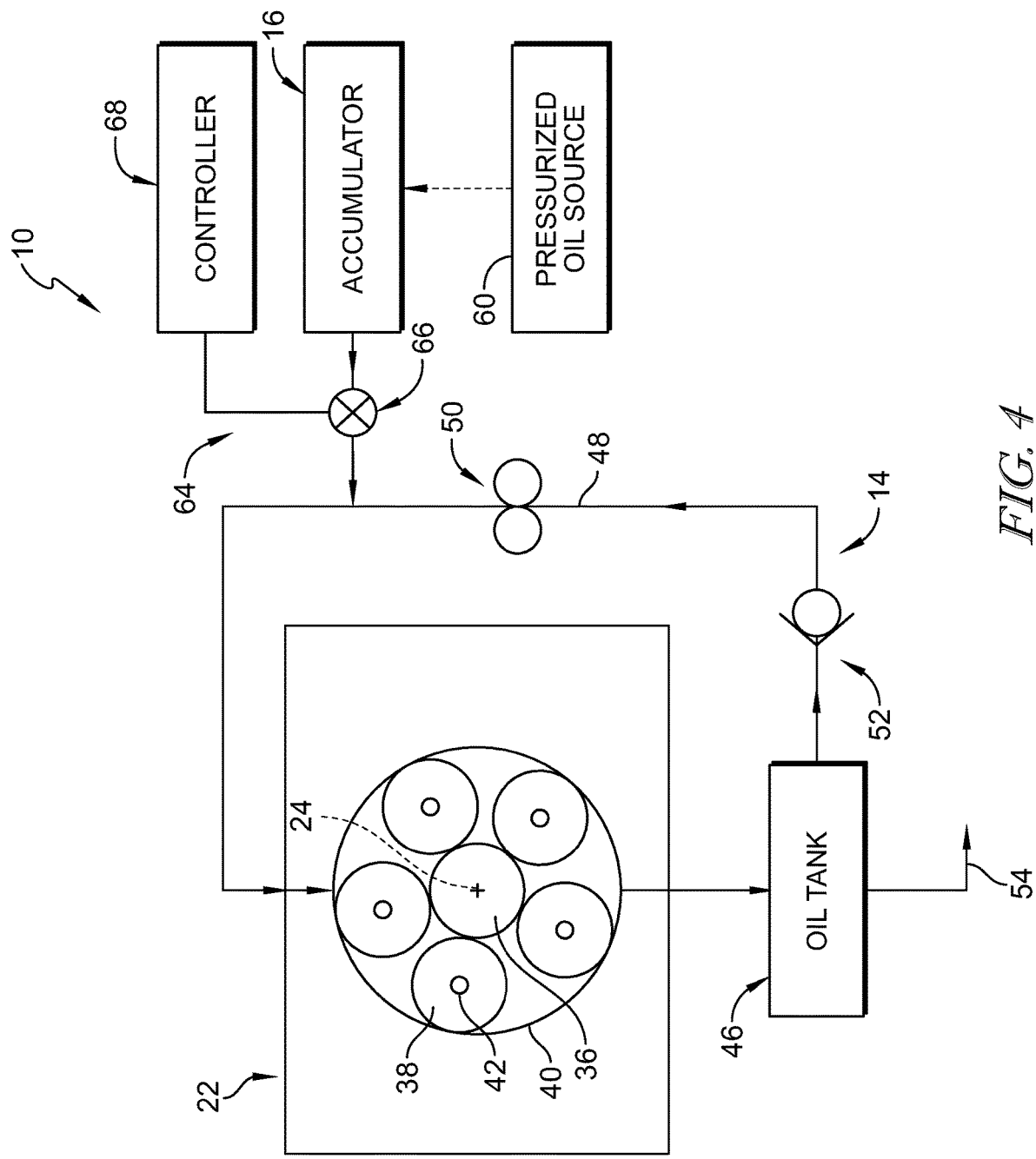
FIG. 4 is a diagrammatic view of an arrangement of the gearbox, oil system, and oil accumulator adapted for use with the gas turbine engine of FIG. 1 showing the accumulator fluidly connected with the conduit downstream of the pump and configured to be pressurized by at least one of the pump and the pressurized oil source.

The oil accumulator 16 is fluidly connected to the conduit 48 in some embodiments so that it may discharge the store of pressurized oil to the gearbox 22 as suggested in FIG. 2. The oil accumulator 16 may be fluidly connected to the conduit 48 upstream of the pump 50 as shown in FIG. 3 or downstream of the pump 50 as shown in FIG. 4. In some embodiments, the oil accumulator 16 includes a separate conduit to conduct oil directly from the oil accumulator 16 to the gearbox 22.

The oil accumulator 16 receives the store of pressurized oil from a pressurized oil source 60 in some embodiments as suggested in FIG. 2. The pressurized oil source 60 is the pump 50 in some embodiments as suggested in FIG. 4. The pressurized oil source 60 is independent of the oil system 14 in some embodiments. As an example, the pressurized oil source 60 may be a main oil supply for the gas turbine engine 10 as suggested in FIG. 4. The pump 50 or main oil supply allow the oil accumulator 16 to be filled, discharged, and refilled during flight and operation of the gas turbine engine 10. In other embodiments, the oil accumulator 16 is pressurized with the store of oil before flight and operation of the gas turbine engine 10 and is available only for a single use during flight and not refillable by the pressurized oil source 60 during operation of the gas turbine engine 10.

The store of pressurized oil is has a pressure greater than the pressure in the oil tank 46. Illustratively, the store of pressurized oil has a pressure of about or greater than about the pressure of oil provided by the pump 50. The store of pressurized oil is sized to provide oil to the plain bearings for at least about 2 seconds in some embodiments. The store of pressurized oil is sized to provide oil to the plain bearings for at least about 3 seconds in some embodiments. The store of pressurized oil is sized to provide oil to the plain bearings for at least about 4 seconds in some embodiments. The store of pressurized oil is sized to provide oil to the plain bearings for at least about 5 seconds in some embodiments. The store of pressurized oil is sized to provide oil to the plain bearings for at least about 10 seconds in some embodiments.

An exemplary first arrangement of the gearbox 22, oil system 14, and oil accumulator 16 is shown in FIG. 3. The oil tank 46 receives scavenged oil from the gearbox 22. The pump 50 moves oil from the oil tank 46 through the conduit 48 toward the plain bearings 42 in the gearbox 22. The oil moves through the one-way valve 52 located in series between the oil tank 46 and the pump 50.

The pressurized oil source 60 is independent of the oil system 14 and is the main oil system for the gas turbine engine 10 as suggested in FIG. 3. The pressurized oil source 60 is able to direct oil to components of the gearbox 22 through conduit 62.

The oil accumulator 16 is in fluid communication with the conduit 48 upstream of the pump 50 as shown in FIG. 3. The pressurized oil source 60 is connected with the oil accumulator 16 and configured to provide the store of pressurized oil to the oil accumulator 16.

The oil accumulator 16 is included in an accumulator assembly 64 in the illustrative embodiment that includes the oil accumulator 16, a valve 66, a controller 68, and a second one-way valve 70 as shown in FIG. 3. The second one-way valve is located in series between the oil accumulator 16 and the pressurized oil source 60 to block oil from flowing from the oil accumulator to the pressurized oil source 60. The valve 66 is fluidly connected in series between the oil accumulator 16 and the conduit 48 and is configured to open and close to allow and block the flow of the store of pressurized oil to the conduit 48. The controller 68 is connected with the valve 66 and configured to open and close the valve 66 in response to predetermined criteria being met such as a flight condition like a zero g-force event.

In some embodiments, the controller 68 instructs the valve 66 to open in response to detecting or calculating that a predetermined amount of oil is not being delivered to the plain bearings 42. In some embodiments, the controller 68 instructs the valve 66 to open and close in response to manual input from a pilot or input from an engine control system. In some embodiments, the controller 68 instructs the valve 66 to open in response to sensing the pressure in conduit 48 is below a predetermined value.

During operation of the gas turbine engine 10, the pump 50 moves oil from the oil tank 46 through the conduit 48 and conducts the oil to the plain bearings 42 and/or other components of the gearbox 22. If a flight condition such as a zero g-force event occurs, the pump 50 may not be able to move sufficient oil from the oil tank 46 to the gearbox 22. In response to the flight condition, the controller 68 opens the valve 66 to allow the store of pressurized oil in the oil accumulator 16 to discharge into the conduit 48 and pass through the pump 50 to the gearbox 22 to maintain lubrication to the plain bearings 42. The one-way valve 52 blocks the store of pressurized oil from moving to the oil tank from the oil accumulator 16. After the flight condition is over, the controller 68 closes the valve 66, the pump 50 conducts oil from the oil tank 56 to the gearbox 22, and the pressurized oil source 60 refills the oil accumulator 16 with the store of pressurized oil.

An exemplary second arrangement of the gearbox 22, oil system 14, and oil accumulator 16 is shown in FIG. 4. The oil tank 46 receives scavenged oil from the gearbox 22. The pump 50 moves oil from the oil tank 46 through the conduit 48 toward the plain bearings 42 in the gearbox 22. The oil moves through the one-way valve 52 located in series between the oil tank 46 and the pump 50.

The oil accumulator 16 is in fluid communication with the conduit 48 downstream of the pump 50 as shown in FIG. 4. The pressurized oil source 60 is connected with the oil accumulator 16 and configured to provide the store of pressurized oil to the oil accumulator 16. The pressurized oil source 60 is independent of the oil system 14 and is the main oil system for the gas turbine engine 10 in the illustrative embodiment. Even still, because the oil accumulator 16 is downstream of the pump 50, the pump 50 is configured to act as a pressurized oil source 60 and provide the store of pressurized oil to the oil accumulator 16. As such, the pump 50 could be a backup source or the independent oil source 60 could be omitted.

The oil accumulator 16 is included in the accumulator assembly 64 in the illustrative embodiment that includes the oil accumulator 16, the valve 66, and the controller 68 as shown in FIG. 4. The controller 68 is connected with the valve 66 and configured to open and close the valve 66 in response to predetermined criteria being met such as a flight condition like a zero g-force event. In some embodiments, the controller 68 instructs the valve 66 to open in response to detecting or calculating that a predetermined amount of oil is not being delivered to the plain bearings 42. In some embodiments, the controller 68 instructs the valve 66 to open and close in response to manual input from a pilot or input from an engine control system. In some embodiments, the controller 68 instructs the valve 66 to open in response to sensing the pressure in conduit 48 is below a predetermined value.

Figure 5:
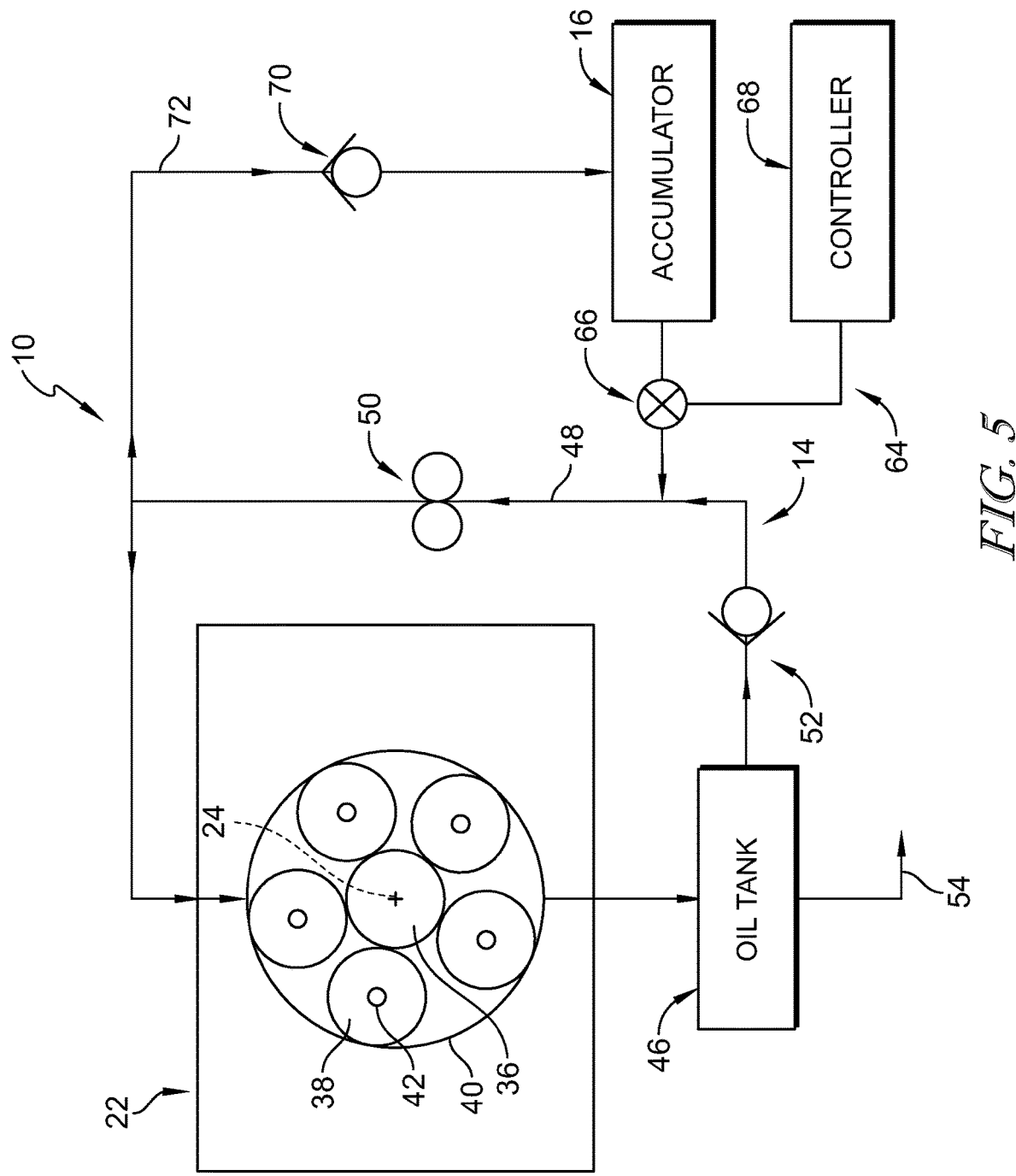
FIG. 5 is a diagrammatic view of an arrangement of the gearbox, oil system, and oil accumulator adapted for use with the gas turbine engine of FIG. 1 showing the accumulator fluidly connected with the conduit upstream of the pump and configured to be pressurized by the pump.

An exemplary third arrangement of the gearbox 22, oil system 14, and oil accumulator 16 is shown in FIG. 5. The oil tank 46 receives scavenged oil from the gearbox 22. The pump 50 moves oil from the oil tank 46 through the conduit 48 toward the plain bearings 42 in the gearbox 22. The oil moves through the one-way valve 52 located in series between the oil tank 46 and the pump 50.

The oil accumulator 16 is in fluid communication with the conduit 48 upstream of the pump 50 to discharge the store of pressurized oil into the conduit 48 upstream of the pump 50 as shown in FIG. 5. The oil accumulator 16 is in parallel with the pump 50 through conduit 72 that splits from the conduit 48 downstream of the pump 50. As such, the pump 50 is the pressurized oil source 60 connected with the oil accumulator 16 to provide the store of pressurized oil to the oil accumulator 16. The one-way valve 70 is coupled to the conduit 72 between the pump 50 and the oil accumulator 16 to block oil flow from the oil accumulator 16 to the conduit 48 through the valve 70.

The oil accumulator 16 is included in the accumulator assembly 64 in the illustrative embodiment that includes the oil accumulator 16, the valve 66, the controller 68, and the valve 70 as shown in FIG. 5. The controller 68 is connected with the valve 66 and configured to open and close the valve 66 in response to predetermined criteria being met such as a flight condition like a zero g-force event. In some embodiments, the controller 68 instructs the valve 66 to open in response to detecting or calculating that a predetermined amount of oil is not being delivered to the plain bearings 42. In some embodiments, the controller 68 instructs the valve 66 to open and close in response to manual input from a pilot or input from an engine control system. In some embodiments, the controller 68 instructs the valve 66 to open in response to sensing the pressure in conduit 48 is below a predetermined value.

Figures 6, 7:
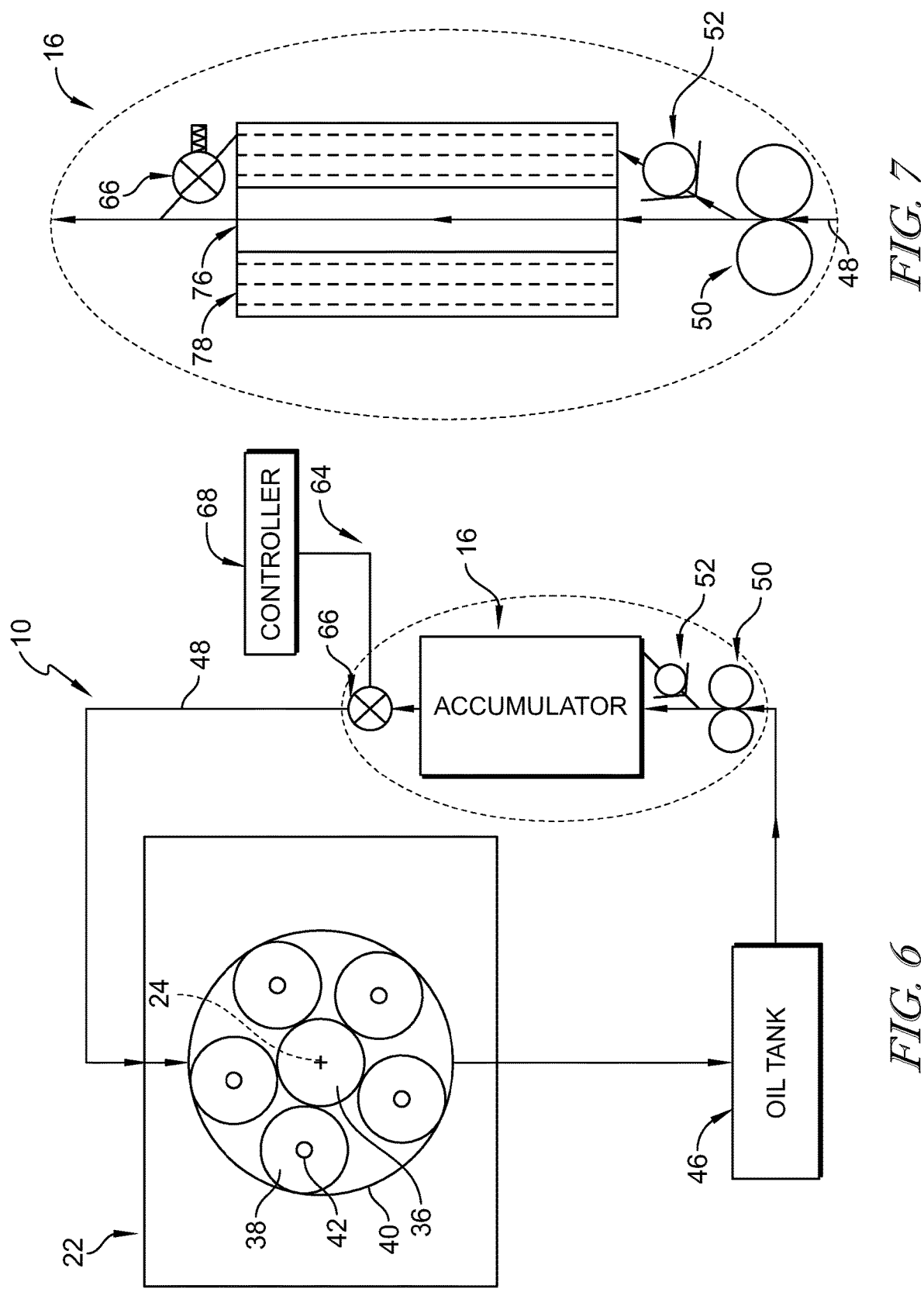
FIG. 6 is a diagrammatic view of an arrangement of the gearbox, oil system, and oil accumulator adapted for use with the gas turbine engine of FIG. 1 showing the accumulator fluidly connected with the conduit in series between the pump and the oil tank and configured to be pressurized by the pump.
FIG. 7 is a diagrammatic view of the oil accumulator of FIG. 6 showing that the oil accumulator includes an inner tube in fluid communication with the pump to bypass oil through the oil accumulator and an outer tube arranged around the inner tube and configured to contain the store of pressurized oil to selectively discharge the store of pressurized fluid in response to predetermine flight conditions.

An exemplary fourth arrangement of the gearbox 22, oil system 14, and oil accumulator 16 is shown in FIG. 6. The oil tank 46 receives scavenged oil from the gearbox 22. The pump 50 moves oil from the oil tank 46 through the conduit 48 toward the plain bearings 42 in the gearbox 22.

The oil accumulator 16 is in fluid communication with the conduit 48 and in series downstream of the pump 50 and the oil tank 46 and configured to discharge the store of pressurized oil into the conduit 48 as shown in FIG. 6. As such, the pump 50 is the pressurized oil source 60 connected with the oil accumulator 16 to provide the store of pressurized oil to the oil accumulator 16. The oil accumulator 16 is further configured to bypass oil through the oil accumulator during typical operation. The one-way valve 52 is coupled between the conduit 48 and the oil accumulator 16 downstream of the pump 50 to block the store of pressurized oil from flowing back toward the pump 50.

The oil accumulator 16 is included in the accumulator assembly 64 in the illustrative embodiment that includes the oil accumulator 16, the valve 66, and the controller 68 as shown in FIG. 6. The controller 68 is connected with the valve 66 and configured to open and close the valve 66 in response to predetermined criteria being met such as a flight condition like a zero g-force event. In some embodiments, the controller 68 instructs the valve 66 to open in response to detecting or calculating that a predetermined amount of oil is not being delivered to the plain bearings 42. In some embodiments, the controller 68 instructs the valve 66 to open and close in response to manual input from a pilot or input from an engine control system. In some embodiments, the controller 68 instructs the valve 66 to open in response to sensing the pressure in conduit 48 is below a predetermined value.

The oil accumulator 16 includes an inner tube 76 and an outer tube 78 in the illustrative embodiment as shown in FIG. 7. The inner tube 76 is in fluid communication with the pump 50 through the conduit 48 and is configured to bypass oil from the oil tank 46 through the oil accumulator 16. As such, during typical operating conditions, oil is bypassed through the oil accumulator 16. The outer tube 78 is configured to contain the store of pressurized.

The pump 50 is configured to act as the source of pressurized oil to provide the pressurized oil to the oil accumulator 16. The valve 52 blocks the store of pressurized oil from flowing back to the pump 50. The valve 66 is controllable with controller 68 to open and close to allow the store of oil to discharge into the conduit 48 or to be blocked from being discharged.

The present disclosure combines the function of oil storage with energy storage and the ability for a gas turbine engine 10 with a power gearbox 22 to handle a zero gravity event by allowing for the power gearbox 22 journal bearing health to stay preserved. The stored oil and energy may be discharged selectively to the power gearbox 22 journal bearings in response to predetermined flight conditions such as, for example, a zero g-force event to maintain oil flow to the bearings during the event.

Gas turbine engine architect may face weight challenges and creative methods may be used to reduce the mass of the engine. The present disclosure provides an area of innovation by combining the function of the auxiliary oil tank with the function of the oil accumulator 16 to provide the option for allowing the device to provide semi-pressurized oil in negative or zero gravity events/environments. A continuous flow of oil is provided to the gearbox 22 to lubricate the journal bearings during negative or zero gravity events. In the event that this occurs, the present disclosure provides a consolidated method to protect the power gearbox.

In some embodiments, the system layout can be described by beginning with the power gearbox 2 which includes of the series of planetary gears 38 being driven by a central pinion gear 36 as shown in FIG. 3. The protection of the pressurized oil flow to the auxiliary oil pump 50 is accomplished through the implementation of an oil accumulator 16 upstream of the auxiliary oil pump 50. The oil accumulator 16 takes on and stores pressurized oil via a main pressure pump 60. The valve 70 blocks the pressure/energy stored from being exhausted.

In response to a determined engine condition, the oil accumulator 16 releases the stored energy by opening the valve 66 which is at the outlet of the oil accumulator 16 as shown in FIG. 3. The second check valve 52 is placed inline from the auxiliary tank 46 to the auxiliary pump 50 to block the pressurized oil from the oil accumulator 16 from backing up into the auxiliary oil tank 46 or power gearbox bearing chamber. Following the release of the pressurized oil from the oil accumulator 16 and after it travels through the auxiliary pump 50 it flows through the supply line 48 and eventually into the power gearbox 22 bearing chamber.

In order to continuously supply oil to power gearbox 22 bearing chamber during normal operation, the pressurized oil from the main pump flows through a supply line and eventually into the bearing chamber as suggested in FIG. 3. The pressurized oil line from the main oil pump has the check valve 70 which dead heads into the oil accumulator 16 to build pressure and store energy. When this pressure is at capacity the remainder of the flow will go through the supply line 62 shown as a dashed line.

An alternative layout is illustrated in FIG. 4. This layout changes the location of the oil accumulator 16 to a downstream location from the auxiliary oil pump 50. The theory of operation is similar from an energy storage perspective with the exception of a modified function for the valve 66 that allows oil to flow from the oil accumulator 16 in a pressure loss situation. This valve 66 is a two way valve that either allows oil pressure to build in the oil accumulator 16 to a pre-set level or when oil pressure is lost in the supply line 48 this valve 66 opens and allows the stored energy to supply pressurized oil to the power gearbox 22 bearing chamber.

An alternative layout is illustrated in FIG. 5. The system layout can be described by beginning with the power gearbox 22 which includes the planetary gears 38 being driven by the central pinion gear 36. The protection of the pressurized oil flow to the auxiliary oil pump 50 is accomplished through the implementation of the oil accumulator 16 upstream of the auxiliary oil pump 50. The oil accumulator 16 takes on and stores pressurized oil via the auxiliary oil pump 50 through the oil supply line 72. The check valve 70 blocks the pressure/energy stored from being exhausted through the normal supply line 72 of the auxiliary oil system circuit.

The oil accumulator 16 is configured to release the stored energy by opening the valve 66 which is at the outlet of the oil accumulator 16. A second check valve 52 is placed inline from the auxiliary tank 46 to the auxiliary pump 50 to block the pressurized oil from the oil accumulator 16 from backing up into the auxiliary oil tank 46 or power gearbox bearing chamber. Following the release of the pressurized oil from the oil accumulator 16 and after it travels through the auxiliary pump 50 it flows through the supply line 48 and eventually into the power gearbox bearing chamber. In order to continuously supply oil to power gearbox bearing chamber during normal operation, pressurized oil from the main pump 60 may flow through the supply line or from the oil tank 46 and eventually into the bearing chamber.

An alternative layout is illustrated in FIG. 6. The system layout can be described as beginning with a power gearbox 22 which includes the planetary gear set 38 around the central pinion gear 36. This embodiment includes an inline accumulator 16 which is designed to be a pipe 76 within a pipe 78. The inner pipe 76 is the main fluid flow line supplying oil from the auxiliary pump 50 via the supply line 48. There is a 2-state valve 66 at the outlet of the oil accumulator 16 that will either allow the oil to flow through the oil accumulator 16, but store a specific amount of oil under a slightly higher pressure than the main line, the oil accumulator 16 will then purge the stored energy fluid when the pressure drops in the supply line 48. When the valve 66 opens, it exhausts the fluid pressure within the accumulator chamber 78. The system has the auxiliary oil tank 46 that is fed by a main scavenge pipe. This fluid flows through the check valve 52 to block flow from exiting the oil accumulator 16.

In some embodiments, the oil accumulator 16 is designed as a pipe 76 within a pipe 78 as shown in FIG. 7. The primary flow path of the oil supply is from the auxiliary pump and through the oil accumulator 16. The secondary flow path is from the supply line from the pump 50, stored in the second pipe 78, and then configured to be diverted back into the path 48 of the oil supply.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine comprising
a power unit that includes an engine core comprising a compressor, a combustor, and a turbine, a fan configured to provide thrust for propelling the gas turbine engine, and a gearbox coupled with the fan and the turbine to transmit rotational energy from the turbine to the fan during operation of the gas turbine engine,
an oil system configured to conduct oil to the gearbox during operation of the gas turbine engine, the oil system including an oil tank, conduit in fluid communication with the oil tank and configured to conduct oil to the gearbox, and an oil pump configured to move oil from the oil tank through the conduit, and
an oil accumulator containing a store of pressurized oil, the oil accumulator being in fluid communication with the conduit and configured to conduct the store of pressurized oil through the conduit to the gearbox in response to the gas turbine engine experiencing a zero g-force event,
wherein the oil accumulator is arranged to receive pressurized oil from the oil pump, to store a first portion of the pressurized oil to form the store of pressurized oil, and to bypass a second portion of the pressurized oil through the oil accumulator,
wherein the oil accumulator includes an inner tube in fluid communication with the conduit and an outer tube arranged around the inner tube, the inner tube is configured to bypass oil through the oil accumulator, and the outer tube is configured to contain the store of pressurized oil.

2. The gas turbine engine of claim 1, wherein the gearbox includes a pinion gear configured to rotate about an axis and a plurality of planetary gears arranged circumferentially around the pinion gear relative to the axis and meshed with the pinion gear, each of the planetary gears includes a plain bearing on which the planetary gear rotates during operation of the gas turbine engine, and the conduit is configured to conduct oil toward the plain bearing of each of the plurality of planetary gears.

3. The gas turbine engine of claim 1, wherein the oil accumulator is configured to conduct the store of pressurized oil into the conduit downstream of the oil pump.

4. The gas turbine engine of claim 1, wherein the oil pump, the oil tank, and the oil accumulator are connected with the conduit in series such that the oil pump is located in series between the oil tank and the oil accumulator.

5. A gas turbine engine comprising
a power unit that includes a fan, an engine core comprising a compressor, a combustor, and a turbine, and a gearbox coupled with the fan and the turbine,
an oil system that includes an oil tank, conduit in fluid communication with the oil tank and configured to conduct oil from the oil tank to the gearbox, and a pump configured to move oil from the oil tank through the conduit, and
an accumulator assembly that includes an oil accumulator, a release valve, and a one-way valve, the oil accumulator including a tank that contains a store of pressurized oil at a pressure greater than a pressure of the oil in the oil tank, the tank fluidly connected between the release valve and the one-way valve, the tank fluidly connected to a pressurized oil source via the one-way valve such that the oil is blocked from flowing from the tank to the pressurized oil source, and the accumulator assembly is configured to selectively open the release valve to conduct the store of pressurized oil from the tank to the gearbox,
wherein the oil accumulator includes a first tube in fluid communication with the conduit and a second tube in fluid communication with the conduit, the first tube is configured to bypass oil through the oil accumulator, and the second tube is configured to contain the store of pressurized oil,
wherein the second tube is arranged around the first tube.

6. The gas turbine engine of claim 5, further comprising a controller configured to activate the valve to allow the oil accumulator to conduct the store of pressurized oil to the gearbox in response to the gas turbine engine experiencing a zero g-force event.

7. The gas turbine engine of claim 5, wherein the pump is the pressurized oil source configured to supply the oil accumulator with the store of pressurized oil.

8. The gas turbine engine of claim 5, wherein the pump, the oil tank, and the oil accumulator are connected with the conduit in series such that the pump is located in series between the oil tank and the oil accumulator.

9. A method comprising
providing a gearbox for use with a gas turbine engine, an oil system, and an accumulator assembly, the accumulator assembly including an oil accumulator, a release valve, and a one-way valve, wherein the oil accumulator includes a first tube and a second tube that is coaxial with and arranged around the first tube, the first tube is configured to bypass oil through the oil accumulator, and the second tube is configured to contain a store of pressurized oil,
fluidly connecting the oil accumulator between the release valve and the one-way valve,
charging the oil accumulator with the store of pressurized oil by flowing oil through the one-way valve into the second tube of the oil accumulator,
conducting oil through the first tube to the gearbox from the oil system, and
conducting the store of pressurized oil from the second tube of the oil accumulator to the gearbox by opening the release valve.

10. The method of claim 9, further comprising detecting a zero g-force event and opening the release valve in fluid communication with the oil accumulator in response to detecting the zero g-force event before the step of conducting the store of pressurized oil from the oil accumulator to the gearbox.

11. The method of claim 9, wherein the oil system includes an oil tank, a conduit configured to conduct oil to the gearbox, and a pump configured to move oil from the oil tank through the conduit, the method further comprising detecting a pressure in the conduit is less than a predetermined value and opening the release valve in fluid communication with the oil accumulator in response to detecting the pressure in the conduit is less than the predetermined value before the step of conducting the store of pressurized oil from the oil accumulator to the gearbox.

12. The method of claim 11, wherein charging the oil accumulator with the store of pressurized oil includes diverting a portion of the oil exiting the pump through the one-way valve into the oil accumulator.

13. The method of claim 11, wherein the oil tank and the pump are connected with the conduit in series and the oil accumulator is connected with the conduit in series relative to the pump.

14. The method of claim 13, wherein the oil accumulator is fluidly connected with the conduit downstream of the pump.

\* \* \* \* \*